March 4, 1924. 1,485,772
F. I. DU PONT
LIQUID LEVEL GAUGE
Filed July 21, 1923 2 Sheets-Sheet 2

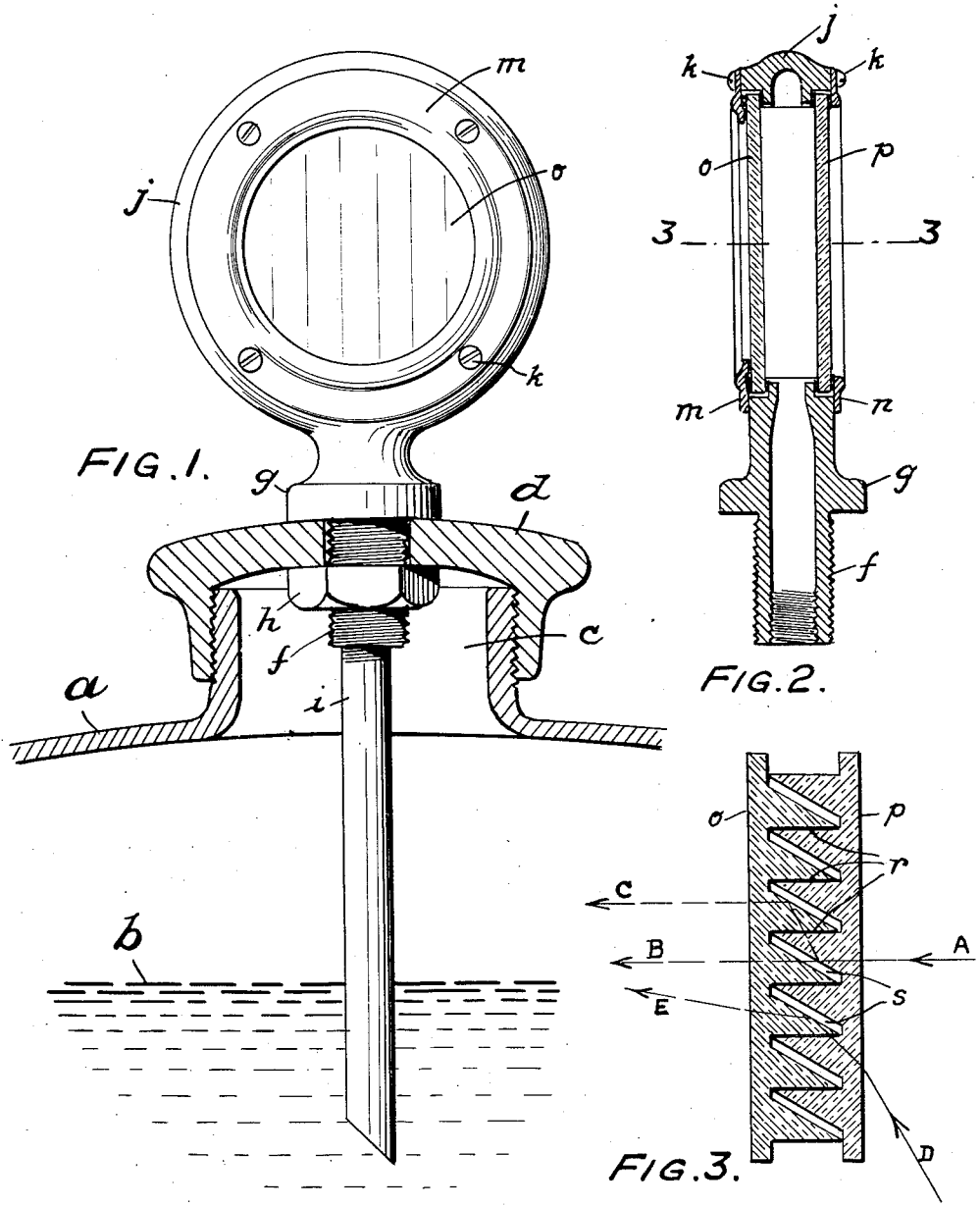

INVENTOR
Francis I. du Pont
BY
Frank L. Busser
ATTORNEY.

WITNESS:

Patented Mar. 4, 1924.

1,485,772

UNITED STATES PATENT OFFICE.

FRANCIS I. DU PONT, OF WILMINGTON, DELAWARE, ASSIGNOR TO DELAWARE CHEMICAL ENGINEERING COMPANY, OF WILMINGTON, DELAWARE, A CORPORATION OF DELAWARE.

LIQUID-LEVEL GAUGE.

Application filed July 21, 1923. Serial No. 652,921.

*To all whom it may concern:*

Be it known that I, FRANCIS I. DU PONT, a citizen of the United States, residing at Wilmington, county of New Castle, and State of Delaware, have invented a new and useful Improvement in Liquid-Level Gauges, of which the following is a full, clear, and exact description, reference being had to the accompanying drawings, which form a part of this specification.

In an application filed by me April 13, 1921, Serial No. 460,998, I set forth a liquid level gauge adapted to indicate when the level of water or other liquid in a container falls below a predetermined height; said gauge comprising a transparent indicator closed to the container at its upper end and above the level at which the liquid is to be registered, and a pipe connection to the lower end of the indicator and communicating with the container at the level to be registered; the device being adapted to indicate whether the liquid is above or below the lower end of the pipe without circulating through the indicator. The gauge is applicable to steam boilers, to automobile radiators and to various other liquid containers. When the gauge is filled with water, the gaseous pressure in the container, which may be pressure of steam in the case of a boiler, or the pressure of atmospheric air in the case of an automobile radiator, will hold the water from flowing out of the gauge until the level of water falls below the level of the opening from the pipe to the container, whereupon the water will flow out of the gauge and be discharged into the container through said pipe opening. Thus means are afforded to visually indicate to an observer whether the liquid in the container is above or below a certain level. The invention is applicable to cases where the point of observation is such as to make it inconvenient or impossible to inspect an ordinary water gauge, or where the application of a ordinary water gauge would be difficult; although it is also adapted to be substituted for an ordinary water gauge in all cases where it is unnecessary or undesired to indicate variations in liquid level.

The gauge described is in every sense operative but in many conditions the difference in appearance between a water-filled indicator and an empty indicator is not sufficiently great to constitute a wholly reliable visual indicator. In any case it is desirable that this difference in appearance should be indicated in a more striking manner, say by a red or other colored appearance when the indicator is empty as contrasted with a clear appearance when the indicator is filled.

The object of my invention is to provide a liquid level gauge of this type. Preferred embodiments of the invention are illustrated in the accompanying drawings, in which—

Fig. 1 is a front elevation of the gauge applied to a liquid container.

Fig. 2 is a vertical cross-section through the gauge.

Fig. 3 is a sectional plan on the line 3—3 of Fig. 2, illustrating the prisms that constitute the main feature of the invention.

Figure 7:
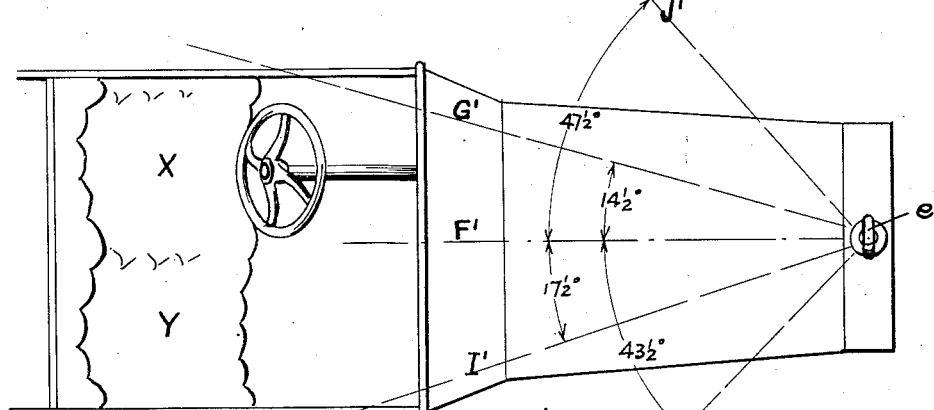
Fig. 7 is a plan view of the front of an automobile, illustrating the gauge of Figs. 5 and 6 applied to the radiator.

Referring to Figs. 1 and 2: $a$ is a container, such as an automobile radiator, containing a body of liquid $b$. The radiator is provided with a filling neck $c$, which is threaded to receive a flanged cap $d$. The cap $d$ is centrally orificed to receive the lower threaded end of the tube $f$ of the gauge. The tube $f$ has a flange $g$ abutting against the top of the cap. A nut $h$, threaded on the tube $f$, engages the under side of the cap $d$ and holds the gauge in place thereon. A pipe $i$ is threaded in the lower end of the tube $f$ and extends down into the interior of the radiator. The bottom of the pipe $i$ opens at the water level to be registered. Integral with the tube $f$ and positioned above the same is an annular indicator holder $j$ having shoulders adapted to receive the two sets of prisms $o$ and $p$ hereinafter described. The prisms are retained in position by means of rings $m$ and $n$, which are secured to the holder by screws $k$.

While the prisms of a set need not be cast or ground from a single piece of glass, as shown, I have illustrated that construction as preferable. As shown in Fig. 3, each set of prisms projects from a disc-shaped base constituting one face of the indicator, the longitudinal extension of each prism being in a vertical direction. One plane face of each prism extends precisely perpendicular to the faces of the indicator. The other vertical face of each prism extends at an angle of about thirty degrees to the perpendicular face. The prisms of each set extend between the prisms of the other set. The faces of the prisms of one set are arranged in parallelism with the corresponding faces of the prisms of the other set. The perpendicular adjacent or opposing faces of adjacent prisms of different sets are almost contiguous, being spaced apart just sufficiently to receive thin sheets, or films r, of translucent or transparent material, which are colored. Any light-permeable colored coating applied to one or both of these opposing plane faces would serve the same purpose. Any color that contrasts effectively with the color of the liquid (in the present instance water) may be selected. A red color is preferred. The other adjacent opposing faces of adjacent prisms are spaced apart to form spaces or channels s whose lower ends open into the tube f.

To apply the gauge to a radiator filled with water, the gauge is filled with water (which runs into the spaces between the prisms) and quickly inverted and dropped into position onto the neck c of the radiator. In this position the pipe extends a considerable distance below the water level. The gauge is then screwed onto the neck. As long as the bottom of the pipe i is below the water level in the radiator, atmospheric pressure in the radiator holds the water from flowing out of the gauge. When the level of water falls to below the open lower end of the pipe i, the water runs out of the indicator. Owing to the narrowness of the spaces between the prisms, water does not escape therefrom instantly, several seconds being required to drain these spaces.

When the gauge is filled with water, the indicator presents a clear appearance to the eye of an observer located directly behind the same. When the gauge is emptied, the indicator presents a colored appearance, the visual effect being an apparent building up of columns of a red liquid within the spaces between the prisms.

This optical illusion may be readily understood by reference to Fig. 3 in connection with the following description. Assume that the spaces between the prisms contain water. A ray of light A will pass through one prism of each set in the direction of A B. The refractive index of water being relatively close to that of glass, no reflection takes place, and the ray of light therefore passes through the column of water between the prisms. The water, as well as the glass, being colorless, there is no appearance of color to the observer.

When the spaces s are drained of water, the faces of the prisms bounding said spaces act as mirrors. A ray of light A is therefore reflected by the reflecting surface of a prism of one set through the colored medium r and is again reflected by the reflecting surface of the adjacent prism of the other set and passes to the observer in the direction C. This light of course appears as colored light to the observer.

Figure 4:
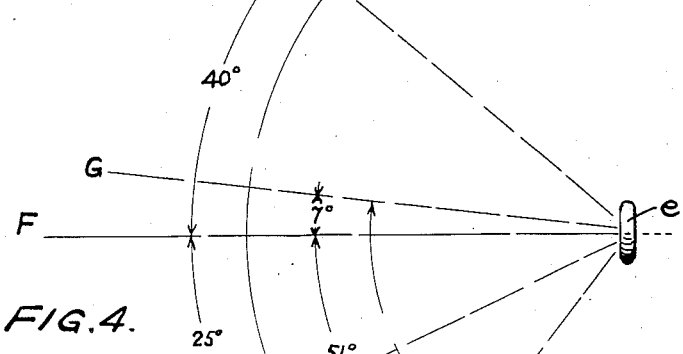
Fig. 4 is a diagram illustrating arcs of visual effectiveness of the prisms of Fig. 3.

Certain conditions exist, however, which make it desirable to modify the construction shown in Fig. 3. If the prisms are constructed and arranged precisely as therein shown, when a ray of light strikes a prism in a decidedly oblique direction, as shown at D, Fig. 3, even though the space s that it strikes is filled with water, some of the light passing through the colored film r will reach the eye at an angle indicated by the direction of the line E. I have found, by experiment, that the minimum angle of said colored reflected rays, when the indicator is filled, is about seven degrees. Therefore, referring to Fig. 4, in which the gauge, as a whole, is lettered e, if an observer facing the gauge is located seven degrees or more to the left of a median line F perpendicular to the face of the gauge (or to the left of the line G), the indicator will appear to him more or less colored even when the gauge is full of water. To the right of this median line F, however, no colored appearance is presented within an angle of about fifty-one degrees, or out to the line H.

When the gauge is empty, a colored appearance is presented within an angle of about twenty-five degrees to the right of the median line F or out to the line I and within an angle of about forty degrees to the left of the median line F or out to the line J.

It is, therefore, clear that the arc of effectiveness of the gauge is that subtended by the lines G and I. The length of this arc is about thirty-two degrees, which provides a wider arc of effectiveness than is necessary, but the center of the arc is considerably to the right of the median line, whereas it is desirable that the center of this arc should more nearly approximate such median line, as the driver of the car is not safely within the seven degree angle outside of which the indicator, when filled, would give a false indication.

If, however, the whole gauge be slightly turned on a vertical axis so that a line perpendicular to its face will extend to the left of the median line F, the gauge will always give reliable indications to observers located in the front seat of an automobile. If turned to a distance of about seven and one-half degrees, a compromise is effected, whereby, when an observer is located within an angle of about fifteen degrees on either side of the median line F', Fig. 7, the indicator will always register color when the gauge is empty and will always appear colorless when the gauge is full. In Fig. 7, the arc of effectiveness for the indicator when the gauge is filled will be within the arc between the lines G' and H', while the arc of effectiveness when the gauge is empty will be within the arc between the lines I' and J'. Thus the gauge will at all times give reliable indications within the arc between lines G' and I', or to observers located at the points X and Y in the automobile.

Figure 5:
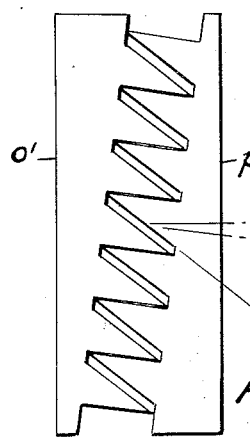
Figs. 5 and 6 are views, similar to Fig. 3, illustrating modifications wherein the arcs of visual effectiveness are shifted to a more nearly central position with respect to a horizontal line perpendicular to the face of the gauge.

The user, however, could not be expected to position the gauge at this particular angle. Without special instructions, he would naturally position the gauge so that the face of the indicator would be perpendicular to the central longitudinal line of the car. I have overcome this objection in two ways. In Fig. 5, the glass of each set of prisms ($o'$, $p'$) is tapered in thickness from one side to the other, so that each set of prisms extends at an acute angle (say of 7° or 8°) to the face of the indicator. If, therefore, the gauge is mounted on the radiator so that its face is perpendicular to the longitudinal central line of the car, the same optical result is obtained as if the gauge of Fig. 3 were turned about seven degrees or eight degrees from this position.

Figure 6:
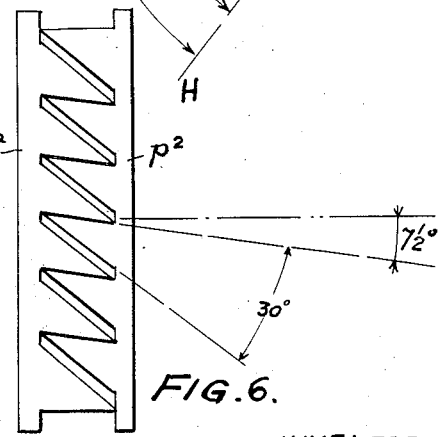

The same result may be accomplished in a still better way and without thickening the glass by the modification shown in Fig. 6. In this modification, the angle of about thirty degrees between the faces of each prism (which angle has been found to give the best results) is retained, and each set of prisms ($o^2$, $p^2$) extends parallel to the face of the gauge, but the plane faces of the prisms are rotated through an angle of about seven and one-half degrees from the positions occupied by such faces in Fig. 3. If a gauge provided with this indicator is mounted on the radiator so that its face is perpendicular to the longitudinel center line of the car, it will, like the indicator of Fig. 5, indicate reliably to the eyes of observers positioned at X and Y, just as if the gauge of Fig. 3 were bodily rotated through the same angle.

Owing to the fact that when the indicator is empty all the rays of light entering a prism are deflected in one lateral direction (to the right) through the colored films and therefore that no colored rays emerge from the prism at one extreme side of the indicator, I prefer to cover this prism on its inside face. This may be done by making the inside retaining ring $m$ wider than the outside retaining ring $n$. While this needlessly covers the operative prism at the other side of the indicator, it gives the gauge a balanced or uniform position and affords a visible face of ample area.

Where, in the claims, I refer to one set of prism faces as substantially perpendicular to the face of the indicator, I do not mean thereby to exclude such slight deviation from perpendicularity as characterizes the nearly perpendicular prism faces of Figs. 5 and 6.

Having now fully described my invention, what I claim and desire to protect by Letters Patent is:

1. A liquid level gauge comprising a pipe which opens at the level to be registered; and an indicator comprising prisms providing channels communicating with said pipe, and colored media associated with said prisms, the angular faces of the prisms, the channels and the colored media being so arranged that light rays passing through the prisms and through a substantial arc to the rear thereof will or will not be colored by said media dependent on whether the channels are empty or filled with liquid.

2. A liquid level gauge comprising a pipe which opens at the level to be registered; and an indicator comprising prisms spaced apart to form liquid channels communicating with said pipe, rays of light being adapted to pass through said prisms and liquid when said channels contain liquid, the faces of said prisms that bound the channels being adapted to act as light reflective surfaces when said channels are drained of liquid, and a colored medium permeable to light rays interposed in the path of such reflected light rays and through which such reflected light rays pass.

3. A liquid level gauge comprising a pipe which opens at the level to be registered; and an indicator comprising prisms having opposing faces forming channels communicating with said pipe and other opposing faces between which colored media are positioned, said faces being arranged at such angles that light rays will pass through the prisms and the liquid contained in the channels when the latter are filled while light rays will be reflected from the channel-forming faces and through said colored media when the channels are drained.

4. A liquid level gauge comprising a pipe which opens at the level to be registered; and an indicator comprising two sets of prisms, prisms of each set having each two faces extending at an angle to each other and parallel to the corresponding faces of the prisms of the other set, the prisms of each set being arranged alternately to the prisms of the other set so as to leave a space of substantial width between two parallel opposing faces of adjacent prisms of different sets, and a colored medium interposed between the other two parallel opposing faces of adjacent prisms of different sets, said spaces communicating with said pipe; whereby when said spaces are filled with water rays of light will pass through both sets of prisms and the water contained in said spaces, while when the water escapes, due to the level falling below the lower end of the pipe, rays of light passing through the prisms will be reflected from the faces of prisms adjacent said spaces and through the colored medium so as to produce a colored effect to an eye in line with the reflected rays.

5. A liquid level gauge comprising a pipe which opens at the level to be registered; and an indicator comprising two sets of prisms, prisms of each set having each two upright faces extending at an angle to each other, one face of a prism extending approximately perpendicular to a horizontal line extending through the set and the other face extending at an acute angle to the first face, the prisms of each set extending between the prisms of the other set with corresponding faces of the prisms of one set arranged in parallel relation with the corresponding faces of the prism of the other set, and a colored medium interposed between the approximately perpendicular adjacent faces of adjacent prisms of different sets, the other adjacent sides of adjacent prisms of different sets being spaced apart to form channels which communicate with said pipe.

In testimony of which invention, I have hereunto set my hand, at Wilmington, Delaware, on this 18th day of July, 1923.

FRANCIS I. du PONT.